(No Model.)

C. F. COOK & J. L. VANDERMARK.
Bag Tie.

No. 233,475. Patented Oct. 19, 1880.

UNITED STATES PATENT OFFICE.

CHARLES F. COOK AND JOHN L. VANDERMARK, OF WILKESBARRE, PA.

BAG-TIE.

SPECIFICATION forming part of Letters Patent No. 233,475, dated October 19, 1880.

Application filed June 21, 1880. (No model.)

*To all whom it may concern:*

Be it known that we, CHARLES F. COOK and JOHN L. VANDERMARK, citizens of the United States, residing at Wilkesbarre, in the county of Luzerne and State of Pennsylvania, have invented a certain new and useful Improved Bale, Bundle, and Bag Tie; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
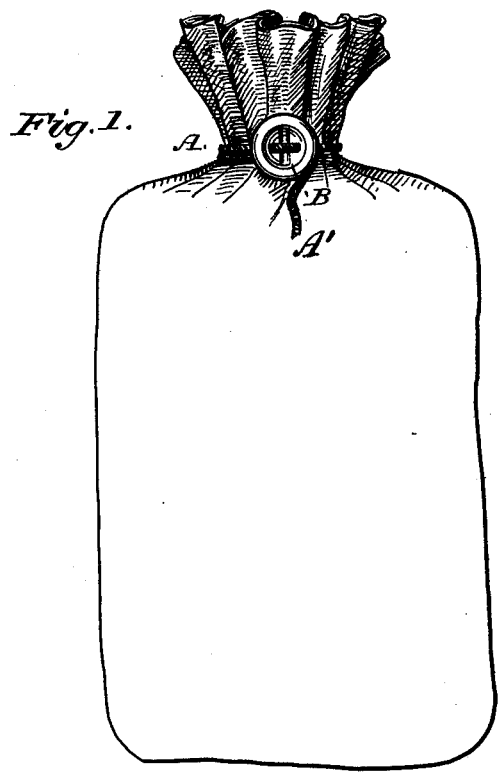
Figure 2:
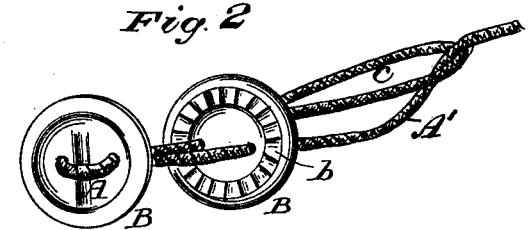

Figure 1 is a view of a sack, bag, bale, or bundle with our improvement applied thereto, and Fig. 2 is a detailed perspective view of our improvement.

This invention contemplates improvements in bag, bale, or sack ties of that class employing a button or disk attached to a tying-cord; and it consists of two meeting disks or buttons with their meeting surfaces notched or gashed, between which the cord is passed while securing or tying it, substantially as hereinafter more fully set forth.

In the accompanying drawings, A indicates the tying-cord, which passes around the neck of the bag or sack, or around the bale or bundle. B B are two disks or buttons with their holes arranged different distances apart, while the meeting surfaces of said buttons or disks are scarfed or notched, as at $b$, radially around their holes. The buttons or disks, by this construction, are caused to bite and more securely hold the cord passed between them in tying it around the neck of the sack or bag, or around the bale or bundle. The cord A, after being passed through and bringing the buttons together with their scarfed or notched surfaces in contact, is looped, as at $c$, at one end, and the tie is applied to the sack, bag, or bundle as follows: The free end A' of cord A is passed through the loop $c$, and the larger loop thus made is slipped over the neck of the bag and tightened by pulling upon the free end of the cord. This brings the two scarfed disks B B in close contact, after which the free end of the cord is turned around or doubled on itself, and inserted between disks B B, and wound around the shank formed by that part of the cord which connects said buttons once or twice. The cord-perforations in the inner disk or button being a greater distance apart than those of the outer disk, and the contiguous faces of both disks being scarfed or notched in the manner described, causes the disks to bite the free end of the tying-cord with considerable tenacity, so that it is not liable to become accidentally unfastened by rough handling of the sacks or bags, as in the case of bag-ties employing smooth disks with their cord-holes at equal distances apart. Hence

We claim as our improvement and desire to secure by Letters Patent of the United States—

1. The described detachable bag, bale, bundle, or sack tie composed of the looped cord A, inserted through disks or buttons B B, provided each with two cord-holes set at different distances apart, substantially as and for the purpose shown and set forth.

2. The described detachable bag, bale, bundle, or sack tie, composed of the looped cord A, inserted through disks or buttons B B, having their contiguous faces scarfed or notched, and provided each with two cord-holes set at different distances apart, substantially as and for the purpose shown and set forth.

In testimony whereof we affix our signatures in presence of two witnesses.

CHARLES F. COOK.
JOHN L. VANDERMARK.

Witnesses:
F. C. MOSIER,
CHAS. A. ZIEGLER.